United States Patent [19]

Masters

[11] Patent Number: 5,546,313

[45] Date of Patent: Aug. 13, 1996

[54] METHOD AND APPARATUS FOR PRODUCING THREE-DIMENSIONAL ARTICLES FROM A COMPUTER GENERATED DESIGN

[76] Inventor: William E. Masters, 100 Bentcreek Dr., Easley, S.C. 29642

[21] Appl. No.: 304,352

[22] Filed: Sep. 12, 1994

[51] Int. Cl.$^6$ .................................................. G06F 19/00
[52] U.S. Cl. .................... 364/468.03; 249/155; 264/219; 425/175; 364/474.24; 364/475.02
[58] Field of Search .............................. 364/468, 473, 364/476, 474.24; 249/155–161; 425/175, 392, 393, 395, 398, 112, 577; 264/219; 156/245

[56] References Cited

U.S. PATENT DOCUMENTS

| | | | |
|---|---|---|---|
| 2,410,888 | 11/1946 | Lucy | 25/118 |
| 3,596,869 | 8/1971 | Humphrey | 249/155 |
| 4,252,514 | 2/1981 | Gates | 425/162 |
| 4,665,492 | 5/1987 | Masters | 364/468 |
| 4,972,351 | 11/1990 | Reger et al. | 364/468 |
| 5,134,569 | 7/1992 | Masters | 364/474.24 |
| 5,151,277 | 9/1992 | Bernardon et al. | 425/112 |
| 5,192,560 | 3/1993 | Umetsu et al. | 425/175 |
| 5,281,117 | 1/1994 | Hong | 425/2 |
| 5,330,343 | 7/1994 | Berteau | 425/175 |

*Primary Examiner*—Joseph Ruggiero
*Attorney, Agent, or Firm*—Cort Flint

[57] ABSTRACT

An apparatus and method for producing three-dimensional articles from a computer aided design includes one or more mold modules, each containing a pin array containing a plurality of pin elements. The pin elements are moveable in response to a data file containing three-dimensional coordinates of the three-dimensional article to be molded wherein the coordinates have a resolution corresponding to the resolution of the pin elements in the pin array. By moving the pins to the various coordinates of the data set, a mold shape is provided for molding the three-dimensional design.

23 Claims, 5 Drawing Sheets

METHOD AND APPARATUS FOR PRODUCING THREE-DIMENSIONAL ARTICLES FROM A COMPUTER GENERATED DESIGN

BACKGROUND OF THE INVENTION

This invention relates to the automated manufacturing of a three-dimensional article whose design has been created with a computer aided design (CAD) machine, and in particular, to a method by which such three-dimensional articles may be rapidly manufactured using a versatile pin array mold.

With the advent of computer aided design, there has been much effort towards rapid prototyping and manufacturing of three-dimensional articles corresponding to the three-dimensional CAD designs in a manner that represents desk-top manufacturing.

U.S. Pat. No. 4,665,492 discloses a concept generally referred to as ballistic particles manufacturing where mass particles are directed to the three-dimensional coordinates of a CAD design in order to build up a corresponding three-dimensional object about an origination point. U.S. Pat. No. 5,134,569 discloses a system and method for at least one dispensing head for dispensing a strand of material in a fluent state, in response to the three-dimensional coordinates of a CAD design in order to build up a corresponding three-dimensional object as the material is solidified.

It has been generally known to utilize a flexible platen which is shaped by a plurality of rods or pins behind the platen controlled either mechanically, electrically, or by computer electronics. For example, U.S. Pat. No. 4,252,514 discloses an apparatus for stereo relief modeling wherein the contour of a flexible platen is determined by adjustable rods which may be raised or lowered to provide a three-dimensional modeling from an aerial photograph and the like. U.S. Pat. No. 2,410,888 discloses a similar table-type device having a vertical array of pins which may be adjusted in a position to provide a three-dimensional surface for a matrix placed over the ends of the pins. A similar molding device is disclosed in U.S. Pat. No. 3,596,869.

U.S. Pat. Nos. 5,192,560 and 5,151,277 disclose press die molds wherein opposing surfaces of the press die molds are defined by linear movable die members. In the case of the first patent, the vertically movable die members are positioned by a controller having a protruded rod movable to engage and set the die members in positions for pressing out a desired shape. U.S. Pat. No. 5,281,117 discloses another die mold having opposing casings with a plurality of die elements arranged in a matrix. Opposing die elements may be moved towards each other to engage spaced flexible diaphragms for holding a fiber work-piece and press and die mold surfaces for forming the fiber work-piece.

U.S. Pat. No. 4,972,351 discloses a pin matrix designed to measure a three-dimensional contour rather than manufacture a three-dimensional contour. In this arrangement, a matrix of pin elements is utilized to map the contour of the seat portion of a patient in order to make a body support. An array of linear transducers read the movement of the pin elements and generate cross-sectional signals utilized to control a cutting device which cuts a sheet of stock foam in accordance with the cross-sectional area mapped. Similarly, U.S. Pat. No. 5,281,117 discloses a pin matrix mold where pin elements are shaped into a cavity by first inserting the object between the pins and engaging the object to conform the pin elements to the object shape.

SUMMARY OF THE INVENTION

The above objectives are accomplished according to the invention by providing an apparatus for rapidly producing an article having a three-dimensional design generated on a computer aided design (CAD) machine which includes a data file containing coordinate records of three-dimensional coordinates corresponding to the design of the three-dimensional article generated on the CAD machine. The three-dimensional coordinates have a prescribed coordinate resolution. A mold is provided having at least one mold unit with a plurality of pin elements arranged in a pin array in which terminal ends of the pin elements may be moved to the three-dimensional coordinates. A positioning device moves the pin elements in a linear direction so that terminal ends of the pin elements are located at the coordinates. A controller receives the data file and is operatively connected to the positioning device for controlling the positioning device in response to the coordinate records. The pin array has a pin resolution corresponding to the coordinate resolution of the three-dimensional coordinates in the three-dimensional design so that the terminal ends of the pin elements define a mold shape corresponding generally to a surface of the three-dimensional design of the article for accurate molding of the article. The positioning device includes drive elements operatively connected to the pin elements, drive heads for rotating the drive elements, a drive motor for driving the drive heads; and a two-dimensional plotter for moving the drive motor to first and second coordinates of the three-dimensional coordinates. The drive motor drives the drive heads to position the terminal end of the pin elements at the third coordinates of the three-dimensional coordinates. Preferably, the pin elements have a hexagonal cross-section with planar surfaces arranged in the pin array where the planar surfaces lie flush with one another to eliminate space between adjacent pin elements within close tolerances. A generally continuous mold surface is provided by the terminal ends of the pin elements. The pin array includes horizontal rows of aligned, uninterrupted pin elements, and vertical rows of aligned, but interrupted pin elements to accommodate the hexagonal shape. Advantageously, the mold comprises a plurality of the mold units having a plurality of opposed pin elements arranged in the pin arrays; and a mold work chamber disposed between opposing mold units. A mold interface is formed at the junction of each the mold unit and the work chamber. The terminal ends of the pin elements lie in a common plane when in a zero position, generally co-planar with the mold interface. A flexible membrane is disposed across the mold interface. A vacuum source is connected to the mold units for applying a vacuum to a back side of the membrane to conform the membrane to the shape defined by the terminal ends of the pin elements. A port is defined at the mold interface for the introduction of molding material to the mold cavity formed in the work chamber. In accordance with the invention, a method of rapidly reproducing a three-dimensional article according to a three-dimensional design generated on a computer aided design (CAD) machine includes providing a data file containing coordinate records of three-dimensional coordinates corresponding to the design of the three-dimensional article generated on the CAD machine where the three-dimensional coordinates having a prescribed coordinates resolution. A mold is provided for molding the article having at least one mold unit which includes an array of pin elements having a pin array resolution pin corresponding to the coordinate resolution. The pin elements have terminal ends defining a mold shape. The position of the pin elements in the mold unit is controlled in response to the coordinate records in the data file to position the terminal ends of the pin elements generally at the three-dimensional coordinates to form a mold shape corresponding to the article. A material from which the three-dimensional article is formed is introduced into the mold, and the three-dimensional article is formed in accordance with the mold shape.

The coordinate records are generated on the CAD machine to provide a coordinate resolution which corresponds to the pin array resolution. The drive heads are arranged in a two dimensional array corresponding to a first and a second of the three-dimensional coordinates, and the drive head move the terminal ends of the pin elements to a third terminal ends of the pin elements to a third of the three-dimensional coordinates. Next, the method may include providing an optional membrane overlying the pin array having a first side defining the mold shape and a second side contacted by the terminal ends of the pin element. A vacuum is applied to the second side of the membrane to conform the membrane to the contour of the terminal ends of the pin elements. The pin elements are moved to the coordinates using an automatic controller which mechanically engages a drive head of the pin elements. The method includes reproducing the article by injecting the molding material into a cavity formed by the mold shape in a fluent state, or placing the molding material over the terminal ends of the pin elements in a sheet form, and conforming the sheet to the three-dimensional design using a vacuum, or reproducing the article by compressing a molding material in the mold shape using compression molding, or reproducing the article by spraying or flowing a liquid or slurry on the surface then hardening the material to take on the shape of the CAD designed surface. Preferably, the coordinates are generated in a cartesian coordinate system wherein the coordinates have a resolution in the coordinate system corresponding to the resolution of the pin elements in the pin array. Included in the data are coordinates positioning the pin elements to define a path for introducing mold material to the mold shape. One or more mold units may be arranged to interface in a mold forming relation to a common work chamber to form a mold for any application.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The invention relates to the automatic manufacture of a three-dimensional article whose design has been created on a CAD machine.

Figure 1:
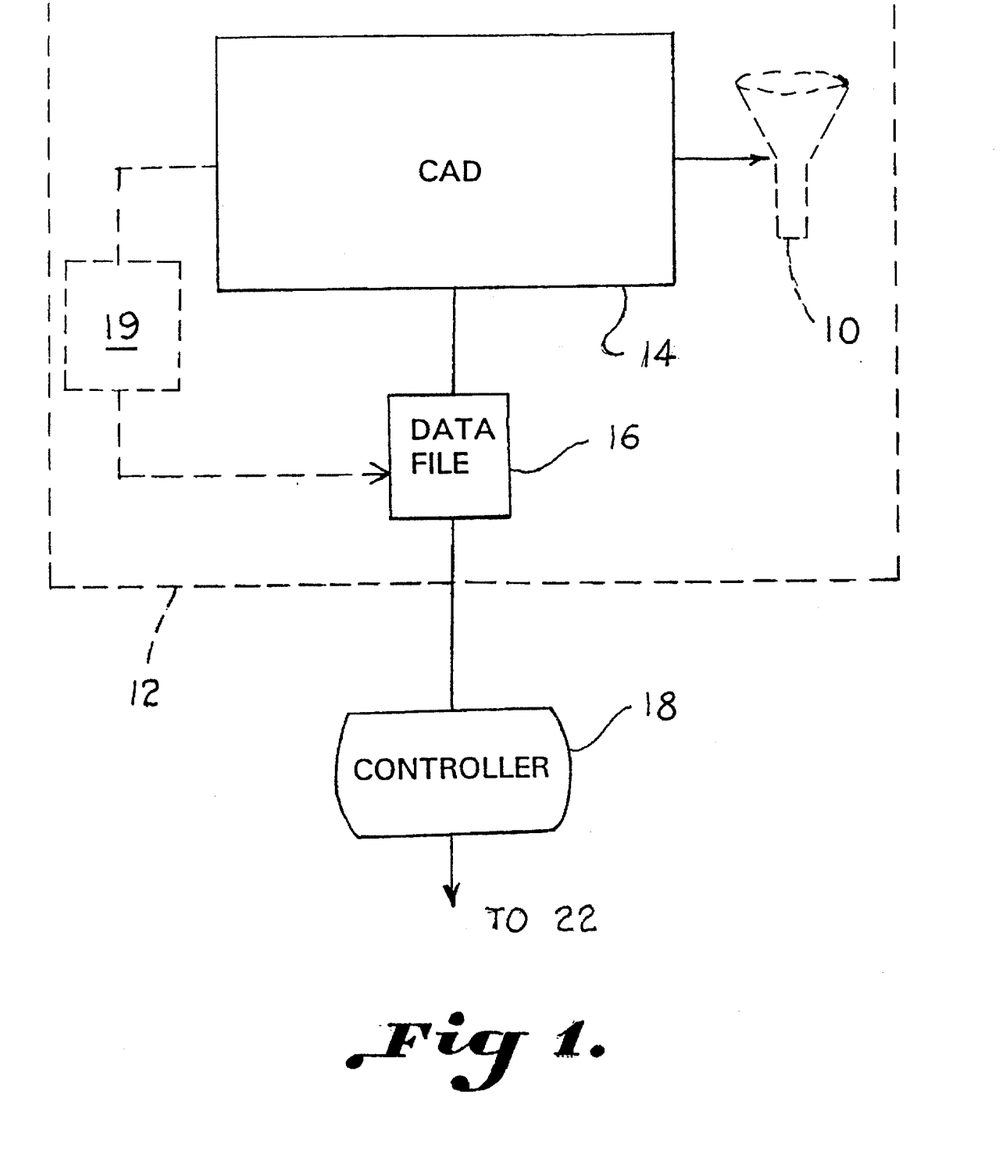
FIG. 1 is a schematic illustration of an apparatus and method for automatically manufacturing a three-dimensional article designed on a CAD machine according to the invention.

Referring now in more detail to the drawings, FIG. 1 illustrates an article 10 in the form of a funnel, for example, which has been designed by a computer system 12 which includes a computer machine 14 which designs the article by instruction from a draftsman or designer. Computer machine 14 may be any suitable machine such as a CAD machine. In a typical CAD machine, a designer uses a natural dialog to talk to the computer machine by way of a data tablet and/or keyboard. The operator instructs the machine to create, scale, rotate, modify, and/or label various items of the design and drawing, among other things. The CAD machine answers by interpreting the instructions, accomplishing what it is directed to do, displaying the results of the contemplated design on the terminal's CRT screen, and compiling a data file 16 containing records corresponding to the design generated and displayed on the CAD machine. When the drafting and design method is completed, the data file containing the records of the coordinate information of the three-dimensional design can be stored on a hard disk or other computer storage medium for archival purposes and later use.

In accordance with the invention, data file 16, which may be in the form of coded binary information, is transferred to a controller 18 which may form part of computer system 12 or may be separate. Any suitable software may be utilized to transfer this coded binary information into machine control information for input into controller 18. The controller generates signals which are delivered to a positioning system, designated generally as A, which positions pin elements according to the coordinate information to automatically mold the designed article, as will be more fully described later.

The molding system may be one employing either injection molding, a compression and transfer molding, a vacuum forming molding, or other molding technique.

Figure 2:
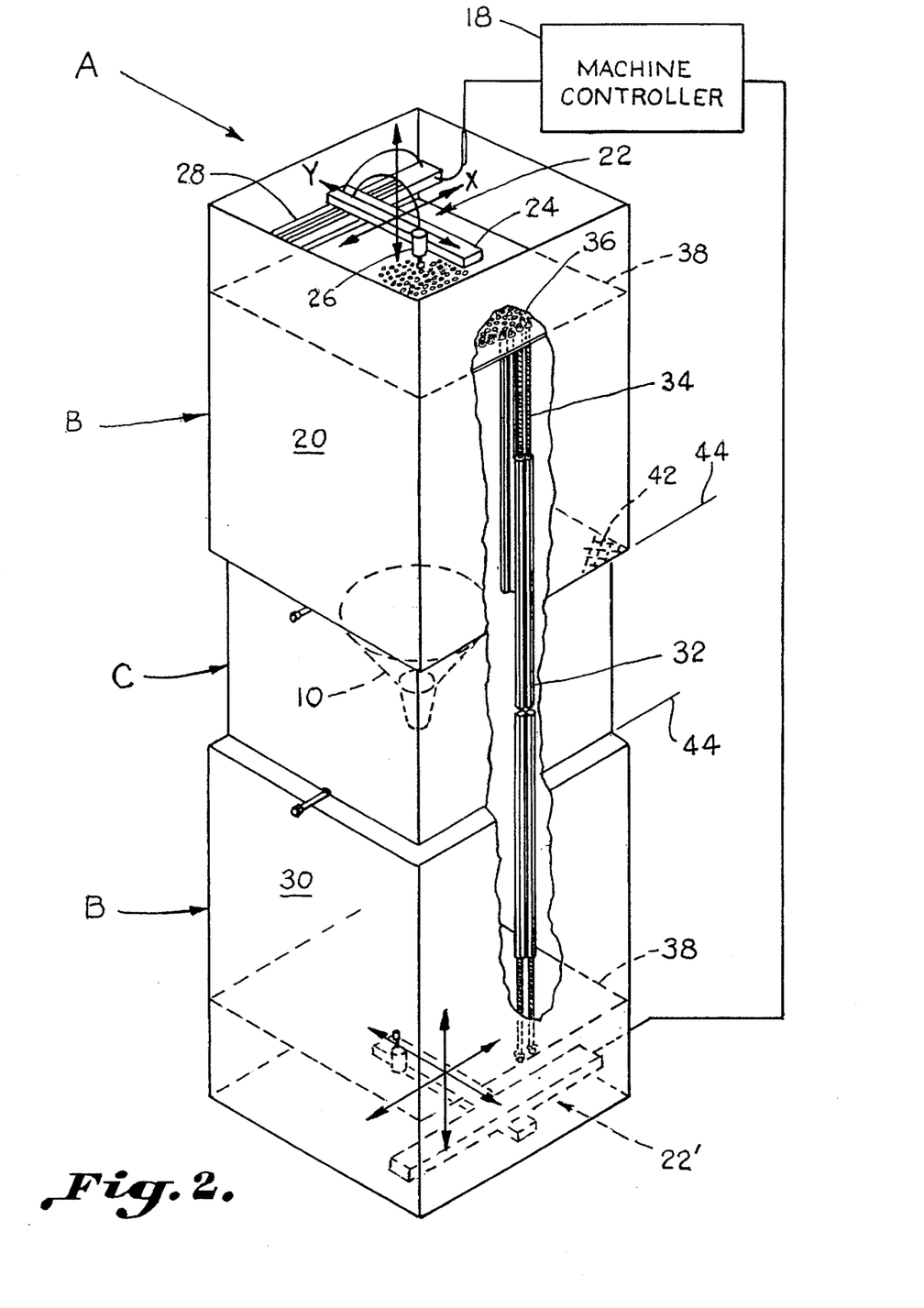
FIG. 2 is a perspective view illustrating an apparatus and method incorporating two mold units for automatically manufacturing a three-dimensional article from a design generated on a CAD machine according to the invention.

As can best be seen in FIG. 2, a mold, designated generally as A is illustrated, which includes a pair of mold units B arranged on opposing sides of a mold work chamber C. There is a top mold unit 20 and a bottom mold unit 30. While mold A is illustrated in a vertical configuration, it is to be understood that the mold arrangement may have any orientation, such as horizontal. Each mold unit B includes a positioning assembly such as a conventional (2-dimensional) X/Y plotter assembly, designated generally as 22, having a first base 24 which carries a step motor 26 in linear reciprocating movements in a first or (Y) direction. Base 24 is carried on a second base 28 for linear reciprocal movements in a second (X) direction. Any suitable X/Y plotter may be utilized, such as a BenchTop Model I plotter manufactured by I & J Fisnar, Inc. of Fair Lawn, N.J. The movement of bases 24, 28 is controlled by machine controller 18 in a manner to be discussed later. An identical X/Y plotter assembly 22' is incorporated into the bottom mold unit 30. Each mold unit B includes a plurality of pin elements 32 arranged in a pin array, as can best be seen in FIGS. 3 through 5. Pin elements 32 have a hexagonal cross-section which is an expedient to the performing of a mold shape. A drive element 34 in the form of a screw rod is threadably mated with internal threads formed in a central bore 35 extending through pin elements 32. Drive element 34 includes a drive head 36 rotatably journaled in a matrix plate 38 using any suitable journal 37 including washers. Drive head 36 is configured to be engaged by a cooperating chuck member 40 on the output shaft of step motor 26. The configuration of drive head 36 and chuck member 40 may be any one of a number of possibilities as long as a positive engagement is provided. In the illustrated embodiment, drive head 36 has a configuration of a standard bolt nut, and chuck 40 may be a correspondingly shaped socket. As step motor 26 is driven in rotation, in engagement with drive head 36, a terminal end 32a of the pin element 32 follows the threads on drive element 34 to extend and retract according to the direction of rotation. In this manner, pin element is positioned at a desired position according to a Z coordinate of the coordinate set (X, Y, Z). It is to be understood, of course, that other coordinate systems may be utilized for specifying the design and controlling the positioning assembly.

Figure 3:
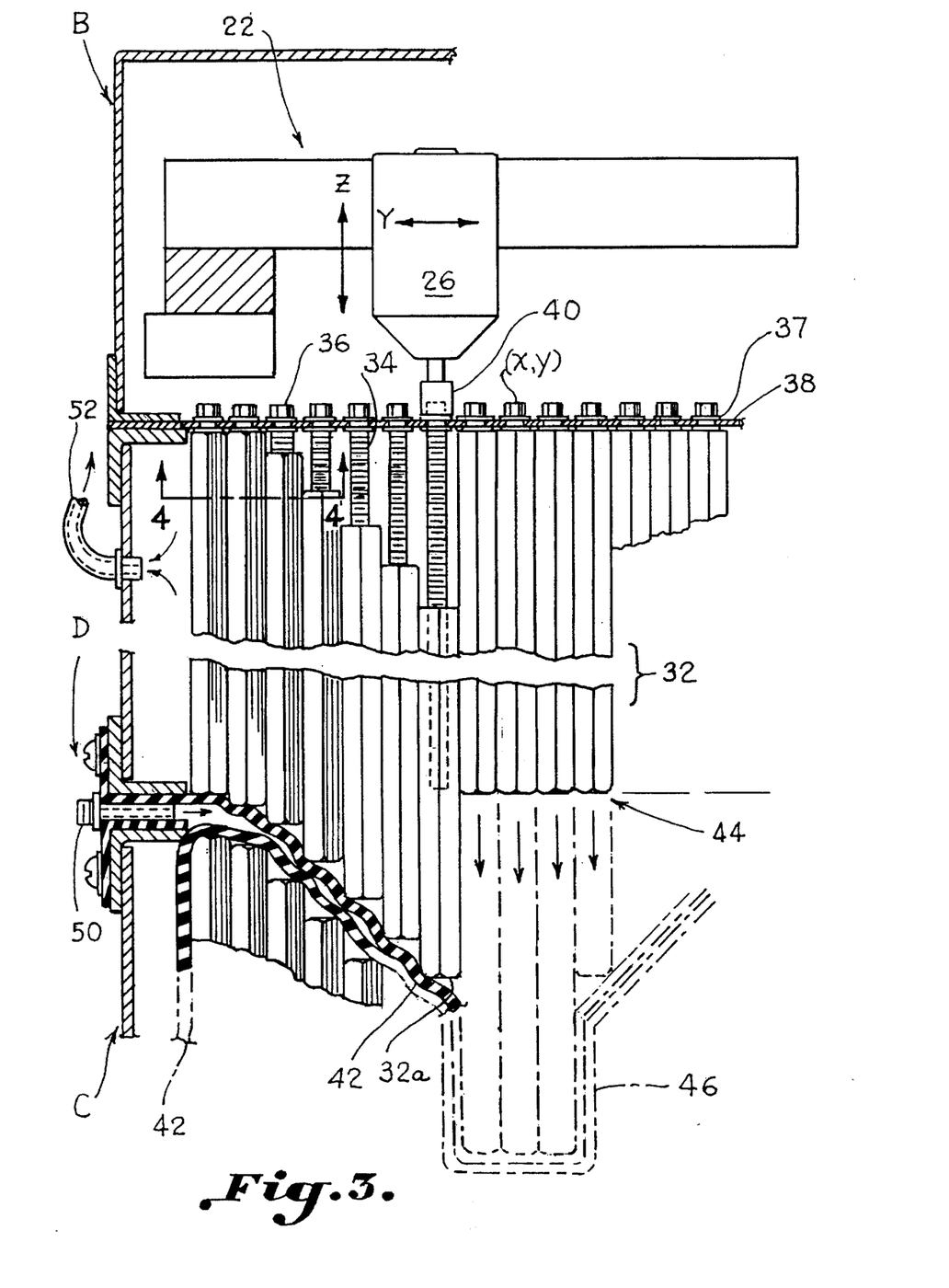
FIG. 3 is a partial sectional view illustrating pin array mold units employed in an apparatus and method according to the invention for automatically manufacturing a three-dimensional article from a design generated by a CAD machine.
Figure 4:
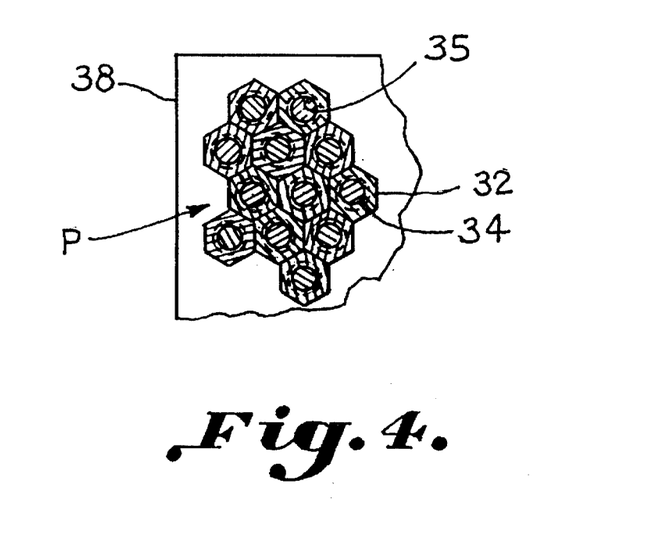
FIG. 4 is a sectional view taken along line 4—4 of FIG. 2.

As can best be seen in FIGS. 3 and 4, the hexagonal cross-section of pin elements 32 allows them to fit closely within tolerances to eliminate any discernible gap or space between adjacent pin elements. The ends of the pin elements have rounded corners so that no sharp edges are presented to a membrane 42. Membrane 42 is disposed across the mold interface 44 defined by a plane encompassing terminal ends 32a of pin elements 32 when in a fully retracted position.

Lower mold unit 30 has an identical construction, and, as can best be seen in FIG. 4, cooperates to define a mold shape 46 corresponding to funnel article 10 in cooperation with pin elements 32 of upper mold unit 20.

In operation, data file 16 is delivered to machine controller 18 and the coordinates for pin elements 32 of upper mold unit 20 are delivered to X/Y plotter assembly 22 for positioning pin elements 32. Simultaneously, the coordinate sets which position lower pin elements 32 of lower mold unit 30 are delivered to X/Y plotter assembly 22. The resolution of pin elements 32 in the pin array is known and the resolution of the coordinates generated by the CAD machine are calculated to correspond to the prescribed resolution of the pin array. Thus, a coordinate point is provided for each pin element. Alternately, if the design of the article is generated with increased resolution for a better definition of the article, the original coordinates may be converted in a data converter 19 so as to have a coordinate resolution matching the resolution of the pin array (FIG. 1). In either case, step motor 26 is moved by machine controller 18, and position assembly 22, to each of the X/Y coordinates of pin elements 32 in the pin array and corresponding drive head 36. At each X/Y coordinate, step motor 26 drives drive element 36 to position terminal end 32a of pin element 32 at its prescribed Z coordinate. Once the mold shape of funnel article 10 is defined by pin elements 32 and engaged membranes 42, the injection molding process illustrated may be begun by the injection or pouring of a molding material. For the purposes of injecting a molding material, a port 50 for the introduction of the material may be provided at interface 44 of upper and lower mold units 20, 30. A path for the injection material, defined by the upper and lower pin arrays and membranes, may be calculated by the CAD machine as it generates coordinates for the three-dimensional article. A vacuum port 52 is provided for each mold unit 20, 30 to draw a vacuum in an interior 20a, 30a of the mold units to assist in conforming membranes 42 to the mold shape 40 defined by terminal ends 32a as may be needed for some shapes.

Figure 5:
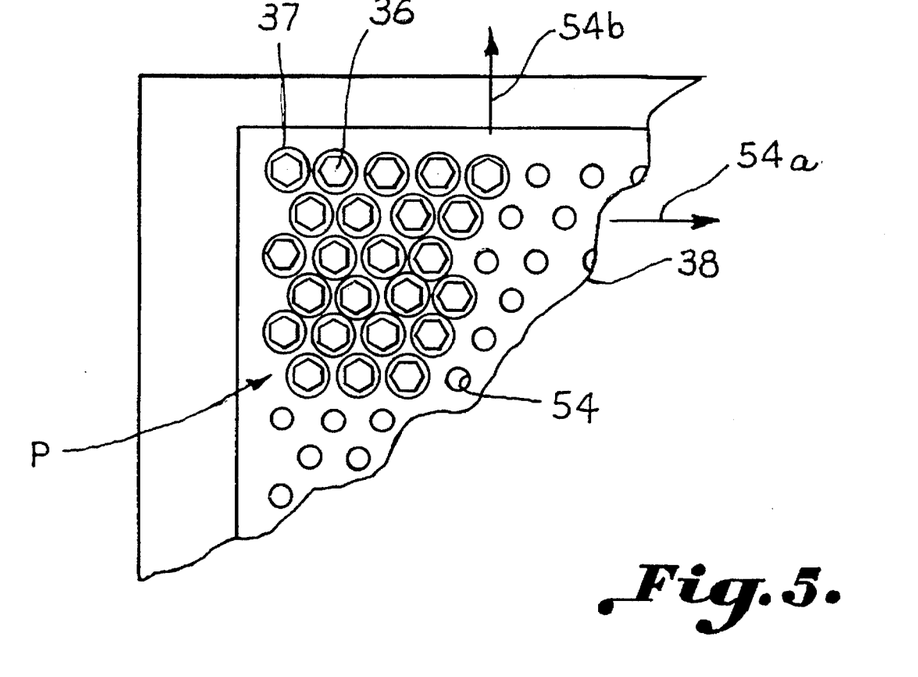
FIG. 5 is a top plan view of the apparatus and method taken along the drive elements for the pin array of FIG. 2.

Referring again to the pin array, designated generally as P, as can best be seen in FIGS. 4 and 5, array plate 38 includes a plurality of openings 54 which receive rotary journal 37 and drive elements 34. It is noted, that in order to accommodate the flush fit of the hexagonal pin elements, the lateral rows of openings 54a are in continuous alignment, while the vertical rows of openings 54b are in a non-continuous alignment, i.e. skip a row. This causes the hexagonal elements to fit flush.

Having been taught the advantages and expedients of the present invention, one skilled in the art will readily see that a number of mold systems can be devised incorporating one or more mold units B according to the present invention to form three-dimensional articles. For example, in vacuum forming, a sheet of moldable material can be placed over a mold interface 44 of a single mold unit B where the pin elements have been positioned in accordance with a three-dimensional shape. A vacuum may be drawn upon the moldable material using conventional vacuum forming techniques to cause the sheet of moldable material to conform to the three-dimensional shape over the terminal ends of the pin array. A flowable liquid or slurry material may be deposited over the surface of the mold shape defined by the pins and hardened. Two or more of mold units B may be fitted together about work chamber C to provide a wide variety of three-dimensional shapes. having been taught the expedients of the present invention, the provision of an appropriate molding system for use with the molding apparatus and method of the present invention will be well within the purview of one having average skill in the molding art.

Figure 6:
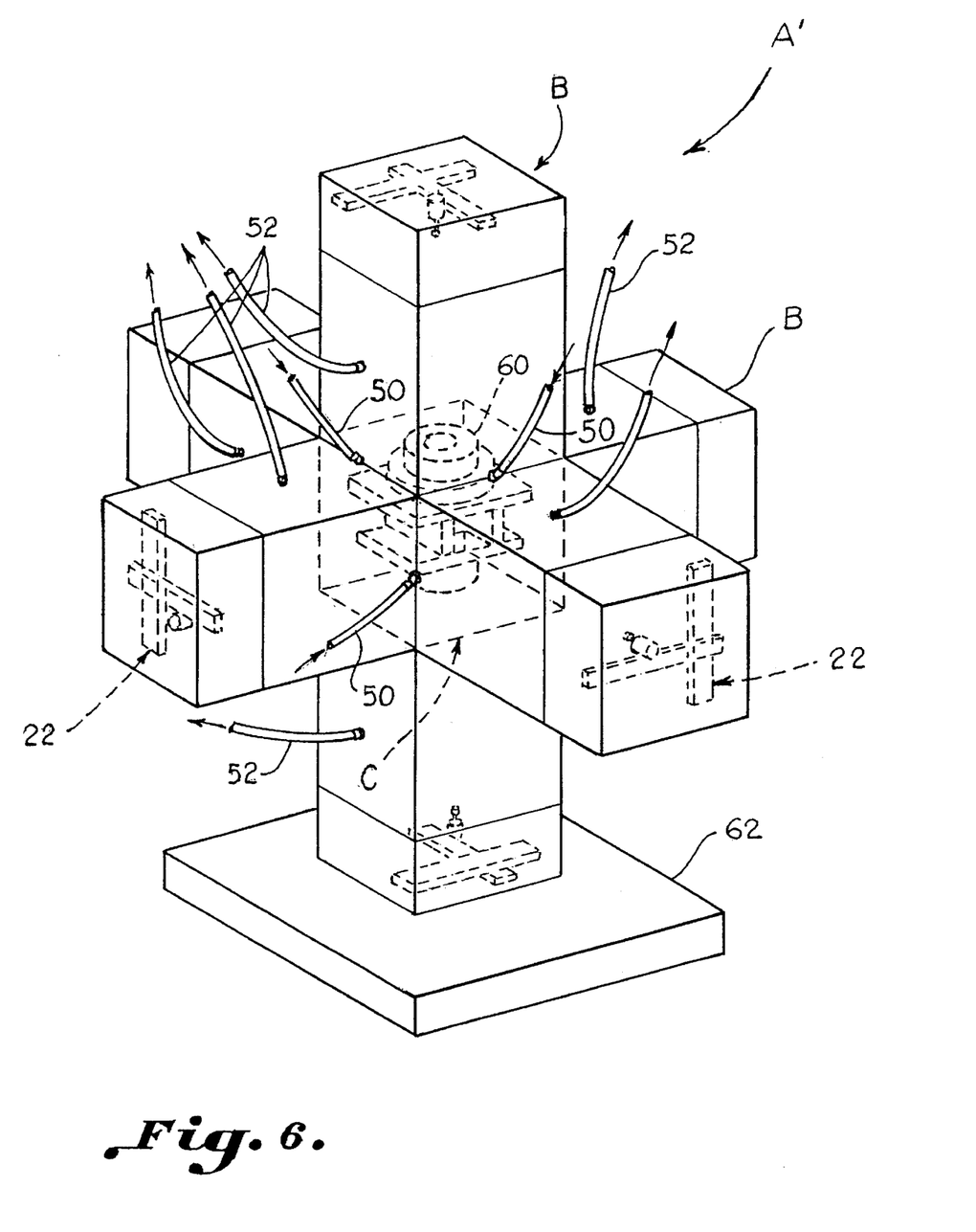
FIG. 6 is a perspective view of a mold having six mold units for producing a three-dimensional according to the invention.

As can best be seen in FIG. 6, a mold system A' is illustrated having six mold units B arranged orthogonally with respect to each other. Mold system A' is capable of molding any three-dimensional article regardless of the complexity. A complex, three-dimensional article 60 is illustrated in FIG. 6 being molded. Article 60 is but one example of an article requiring six orthogonal pin arrays in order to provide a mold shape conforming to the different surfaces of the three-dimensional article. It can thus be seen, that the number of mold units B combined together in order to make a mold system will depend upon the configuration of the three-dimensional article being produced. Mold systems comprising three, four, and five mold units B may be needed to comprise a mold system for certain other types of articles.

Referring again to FIG. 6, it can be seen that each mold unit B is attached to work chamber C about each of its six faces. A mold interface 44 is defined at each junction of the pin array faces of mold units B and work chamber C. A vacuum port 52 is provided for drawing a vacuum in each mold unit. In addition, a material introduction port 50 may be provided at a number of interfaces in order that flexibility in the design of the path of the injected material may be easily calculated by the CAD program. The molding system of FIG. 6 is shown on a pedestal base 62 and a similar base may be provided for the mold system A illustrated in FIG. 2, or any other suitable means for stabilizing the mold system may be provided. It is to be understood that machine controller 18 will control each positioning assembly 22 of each mold unit illustrated in FIG. 6. Any suitable means may be utilized for attaching mold units B to the faces of work chamber C, such as flange and bracket attachments as needed, an example of which is shown in FIG. 3, and designated generally as D. For the purpose of assembling different molding systems comprising different numbers of mold units B, work chamber C is in the form of a cube having equal sides, and the mold interfaces 44 of mold units B also have a square configuration matching the square sides of the work chamber cube.

While a preferred embodiment of the invention has been described using specific terms, such description is for illustrative purposes only, and it is to be understood that changes and variations may be made without departing from the spirit or scope of the following claims.

What is claimed is:

1. A method of rapidly reproducing a three-dimensional article according to a three-dimensional design generated on a computer aided design (CAD) machine using a data file containing coordinate records of three-dimensional coordinates corresponding to said design of said three-dimensional article generated on said CAD machine, said three-dimensional coordinates having a prescribed coordinates resolution, said method comprising:

providing a mold for molding said article having a work chamber with a plurality of interface positions at which from one to six mold units having mold unit faces may be interfaced, each said mold unit including an array of pin elements having a pin array resolution corresponding to said coordinate resolution, and said pin elements having terminal ends defining a mold shape;

selecting the number of mold units interfaced with said work chamber depending on the complexity and shape of the article being molded;

controlling the position of said pin elements in said mold unit in response to said coordinate records in said data file to position said terminal ends of said pin elements generally at said three-dimensional coordinates to form a mold shape corresponding to said article;

introducing a material from which said three-dimensional article is formed into said mold, and forming said three-dimensional article in accordance with said mold shape.

2. The method of claim 1 including generating said coordinate records data file on said CAD machine to provide a coordinate resolution which corresponds to said pin array resolution.

3. The method of claim 2 including providing drive heads arranged in a two dimensional array corresponding to a first and a second of said three-dimensional coordinates, and said drive head to move said terminal ends of said pin elements to a third terminal ends of said pin elements to a third of said three-dimensional coordinates.

4. The method of claim 1 including providing a membrane overlying said pin array having a first side defining said mold shape and a second side contacted by said terminal ends of said pin element.

5. The method of claim 4 including applying a vacuum to said second side of said membrane to conform said membrane to the contour of said terminal ends of said pin elements.

6. The method of claim 1 including moving said pin elements to said coordinates using an automatic controller which mechanically engages a drive head of said pin elements.

7. The method of claim 1 including reproducing said article by injecting said molding material into a cavity formed by said mold shape in a fluent state.

8. The method of claim 1 including placing said molding material over said terminal ends of said pin elements in a sheet form, and conforming said sheet to said three-dimensional design using a vacuum or pressure.

9. The method of claim 1 including depositing one of a liquid and a slurry material over said terminal ends of said pin elements defining said mold shape and causing said material to harden in the shape of said three-dimensional article.

10. The method of claim 1 including generating said coordinates in a cartesian coordinate system wherein said coordinates have a resolution in said coordinate system corresponding to the resolution of said pin elements in said pin array.

11. The method of claim 1 including providing a data file containing coordinates positioning said pin elements to define a path for introducing mold material to said mold shape.

12. An apparatus for rapidly producing an article having a three-dimensional design generated on a computer aided design (CAD) machine comprising:

a data file containing coordinate records of three-dimensional coordinates corresponding to said design of said three-dimensional article generated on said CAD machine, said three-dimensional coordinates having a prescribed coordinate resolution;

a mold having at least one mold unit with a plurality of pin elements arranged in a pin array in which terminal ends of said pin elements may be moved to said three-dimensional coordinates;

a positioning device for moving said pin elements in a linear direction so that terminal ends of said pin elements are located at said coordinates;

a controller for receiving said data file and operatively connected to said positioning device for controlling said positioning device in response to said coordinate records;

said pin array having a pin resolution corresponding to said coordinate resolution of said three-dimensional coordinates in said three-dimensional design so that said terminal ends of said pin elements define a mold shape corresponding generally to a surface of said three-dimensional design of said article for accurate molding of said article; and said pin elements having a hexagonal cross-section defining planar side surfaces, and said pin elements are arranged in said pin array where said planar side surfaces lie flush with one another for relative longitudinal movement and within close tolerances to eliminate interstices between adjacent pin elements so that a generally continuous mold surface is provided by said terminal ends of said pin elements.

13. The apparatus of claim 12 wherein said positioning device includes drive elements operatively connected to said pin elements, drive heads for rotating said drive elements, a drive motor for driving said drive heads; and a two-dimensional plotter for moving said drive motor to first and second coordinates of said three-dimensional coordinates, and said drive motor driving said drive heads to position said terminal end of said pin elements at said third coordinates of said three-dimensional coordinates.

14. The apparatus of claim 12 wherein said pin array includes horizontal rows of continuous pin elements, and vertical rows of non-continuous pin elements.

15. The apparatus of claim 12 wherein said mold comprises:

a plurality of said mold units having a plurality of opposed pin elements arranged in said pin arrays; and a mold work chamber disposed between opposing mold units.

16. The apparatus of claim 15 including a mold interface formed at the junction of each said mold unit and said work chamber; and said terminal ends of said pin elements lying in a common plane when in a zero position, generally co-planar with said mold interface.

17. The apparatus of claim 12 including a flexible membrane disposed across said mold interface.

18. The apparatus of claim 16 including a vacuum source connected to said mold units for applying a vacuum to a back side of said membrane to conform said membrane to the shape defined by said terminal ends of said pin elements.

19. The apparatus of claim 17 including a port defined at said mold interface for the introduction of molding material to said mold cavity formed in said work chamber.

20. The apparatus .of claim 12 including a data file containing coordinates positioning said pin elements to define a path for introducing mold material to said mold shape.

21. The apparatus of claim 12 including a plurality of mold units arranged to interface in a mold forming relation to a common work chamber.

22. An apparatus for rapidly producing an article having a three-dimensional design generated on a computer aided design (CAD) machine comprising:

a data file containing coordinate records of three-dimensional coordinates corresponding to said design of said three-dimensional article generated on said CAD machine, said three-dimensional coordinates having a prescribed coordinate resolution;

a mold having a work chamber in which said article is molded having at least three mold interface positions, and said mold including at least three mold units having mold unit faces which interface with said work chamber at said mold interface positions;

a mold interface formed at the junction of said mold units and said work chamber; and said terminal ends of said pin elements lying in a common plane when in a zero position at with said mold interface so that said pin elements move inwardly and outwardly relative to said work chamber to define a mold cavity;

each of said mold units including a plurality of pin elements arranged in a pin array in which terminal ends of said pin elements may be moved to said three-dimensional coordinates;

a positioning device for moving said pin elements in a linear direction so that terminal ends of said pin elements are located at said coordinates;

a controller for receiving said data file and operatively connected to said positioning device for controlling said positioning device in response to said coordinate records;

said pin array having a pin resolution corresponding to said coordinate resolution of said three-dimensional coordinates in said three-dimensional design so that said terminal ends of said pin elements define said mold cavity is said work chamber in a manner to correspond generally to a surface of said three-dimensional design of said article for accurate molding of said article; and a port defined in said mold interface for the introduction of molding material to said mold cavity formed in said work chamber.

23. The apparatus of claim 22 wherein said work chamber is a cube, and said work interface positrons and said mold unit faces are of a square cross-section whereby one to six of said mold units may be interfaced with said work chamber.

* * * * *